United States Patent [19]

Orndorff et al.

[11] Patent Number: 4,708,223

[45] Date of Patent: Nov. 24, 1987

[54] EMERGENCY LIGHTING FOR ELEVATOR CAB

[75] Inventors: Karl B. Orndorff, Bonneauville Boro; Paul L. Baldwin, Franklin Township, Adams County, both of Pa.

[73] Assignee: Westinghouse Electric Corp., Pittsburgh, Pa.

[21] Appl. No.: 912,855

[22] Filed: Sep. 29, 1986

[51] Int. Cl.$^4$ .......................... B66B 7/00; H05B 37/04
[52] U.S. Cl. ....................................... 187/1 R; 315/86; 362/20; 362/254; 362/386; 362/428
[58] Field of Search ................. 187/1 R; 362/20, 254, 362/286, 287, 386, 427, 428, 458, 802; 315/86, 88

[56] References Cited

U.S. PATENT DOCUMENTS

| 3,320,473 | 5/1967 | Grafham | 315/86 |
| 3,631,942 | 1/1972 | Brounn | 187/1 R |
| 4,013,993 | 3/1977 | Mandel et al. | 315/86 |
| 4,126,210 | 11/1978 | Martin | 187/1 R |
| 4,177,500 | 12/1979 | Nicholl et al. | 362/254 X |
| 4,214,185 | 7/1980 | Breeze | 362/20 X |
| 4,461,974 | 7/1984 | Chiu | 362/20 X |
| 4,597,033 | 6/1986 | Meggs et al. | 362/20 X |
| 4,602,319 | 7/1986 | Moriyama et al. | 362/287 X |
| 4,651,258 | 3/1987 | Davis et al. | 362/386 X |

Primary Examiner—Joseph J. Rolla
Assistant Examiner—Nils E. Pedersen
Attorney, Agent, or Firm—D. R. Lackey

[57] ABSTRACT

An elevator cab in which emergency lighting is concealed until it is required to be utilized. When the normal electrical power supply to the cab fails, the emergency lighting is automatically pivoted from a concealed position behind an inconspicuous wall plate to an exposed position which projects the lens of the emergency lighting fixture into the cab through the opening previously closed by the inconspicuous wall plate. In the exposed position, the emergency lighting is energized by an emergency power supply, with the emergency power supply also automatically becoming available when the normal power supply fails. In a preferred embodiment, the emergency lighting is located in the return, directly above the car station, and below the transom.

7 Claims, 6 Drawing Figures

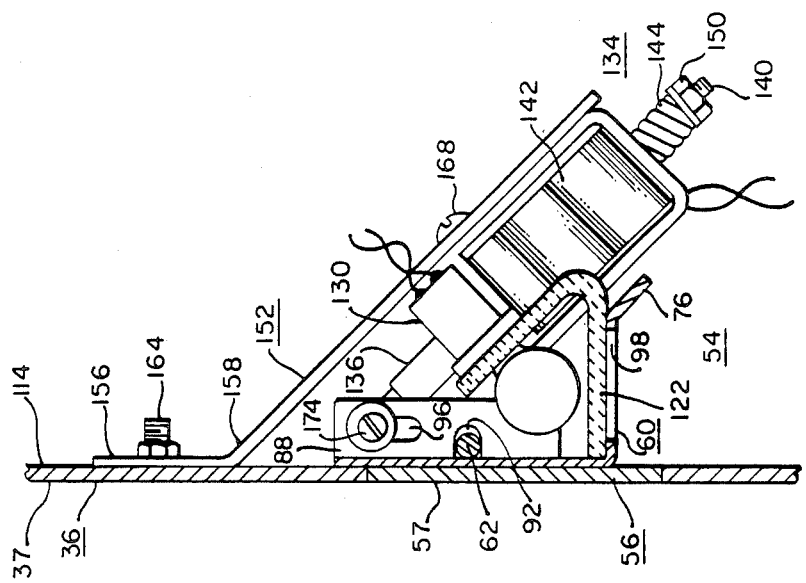
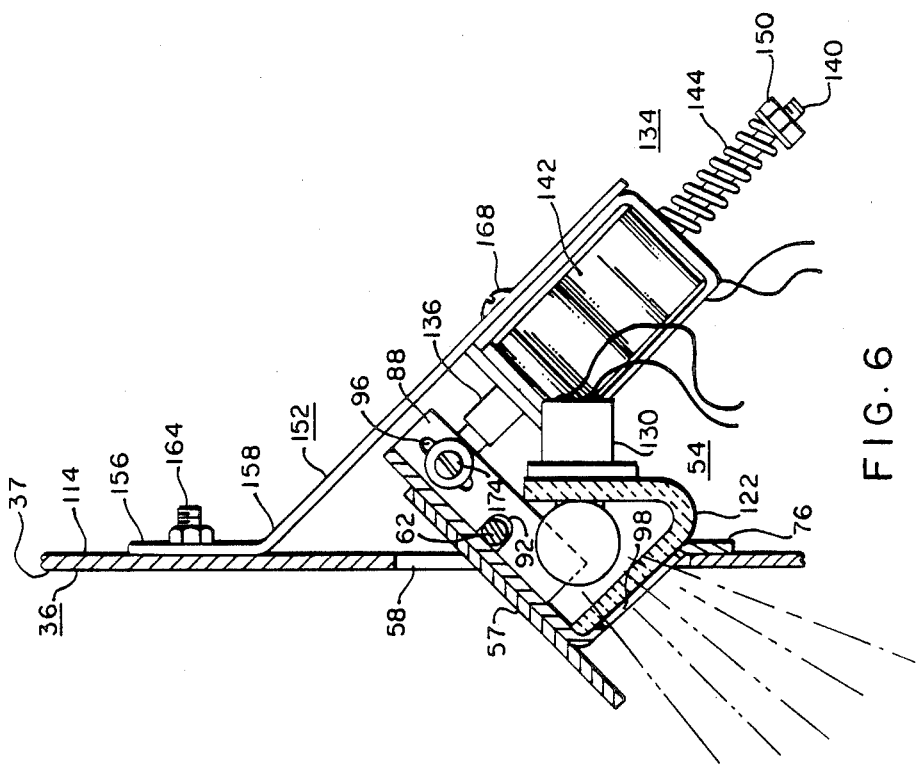

EMERGENCY LIGHTING FOR ELEVATOR CAB

BACKGROUND OF THE INVENTION

1. Field of the Invention:

The invention relates in general to elevator cabs, and more specifically to new and improved arrangements for providing emergency lighting for elevator cabs.

2. Description of the Prior Art:

In addition to the normal lighting source, an elevator cab requires an emergency lighting source which must be automatically activated in the event the normal power supply which energizes the normal lighting source fails. According to the ANSI/ASME A17.1 code, the normal cab lighting for a passenger elevator car must be a minimum of 5 foot candles, and the emergency lighting system must provide a minimum of 0.2 foot candles at a location 4 feet above the car floor and 1 foot in front of the car operating station. Thus, the closer the emergency lighting source can be located to the car operating station, the easier it is to meet the code requirements. As a practical matter, however, in order to prevent the emergency lighting source from being vandalized, it is necessary to locate it above the drop ceiling, where the normal car lighting source is located. Also, it is not at all aesthetically pleasing to have a light fixture located below the drop ceiling.

SUMMARY OF THE INVENTION

Briefly, the present invention is a new and improved elevator car or cab having an emergency lighting source which makes it possible to locate the source below the drop ceiling without being attractive to vandals, and without being aesthetically unpleasing. In a preferred embodiment, the emergency lighting source is mounted directly above the car station, in the swing return, if the cab is of the type which has a swing return, and below the transom. This location is made possible by the invention, as the emergency lighting source is mounted behind a plate which conceals an opening in the wall above the car station. The plate closely fits the opening with hairline joints, smoothly continuing the flat surface of the surrounding wall portion. This makes the plate inconspicuous, and it makes it very difficult for a vandal to force a foreign object into the hairline joint.

The plate is attached to an emergency lighting fixture, which is mounted directly behind the plate. The emergency lighting fixture is pivotally mounted such that in a first position, at one end of the pivotable range, the plate snugly fits the wall opening to conceal the fact that it is associated with emergency lighting. In a second position, at the other end of the pivotable range, the plate has pivoted with the fixture, swinging into the cab as the lens of the fixture pivots into the cab and directs the illumination provided by the emergency lighting source downwardly over the car station to the floor or platform of the elevator cab. Thus, the illumination is provided at the location it is most needed, as well as at the location specified by the hereinbefore mentioned elevator code.

The pivoting force for the emergency lighting fixture is provided by an electrical solenoid which includes a coil which is energized by the normal power supply. In the energized position of the solenoid, the emergency lighting fixture is in the concealed first position. When the normal electrical power supply fails, the solenoid coil is deenergized, and the solenoid drops out to pivot the emergency lighting fixture to the exposed second position. Simultaneously with the loss of normal electrical power, an emergency power supply is activated which energizes the light source associated with the emergency lighting fixture.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 5 is a cross sectional view of the emergency lighting source shown in FIG. 3, taken between and in the direction of arrows V—V; and FIG. 6 is a cross sectional view of the emergency lighting source which is similar to the view shown in FIG. 5, except the emergency lighting source is shown pivoted from the normal concealed position to the exposed position it occupies when the normal cab power supply fails, to provide illumination in the cab via an emergency power supply.

DESCRIPTION OF THE PREFERRED EMBODIMENTS

Figure 1:
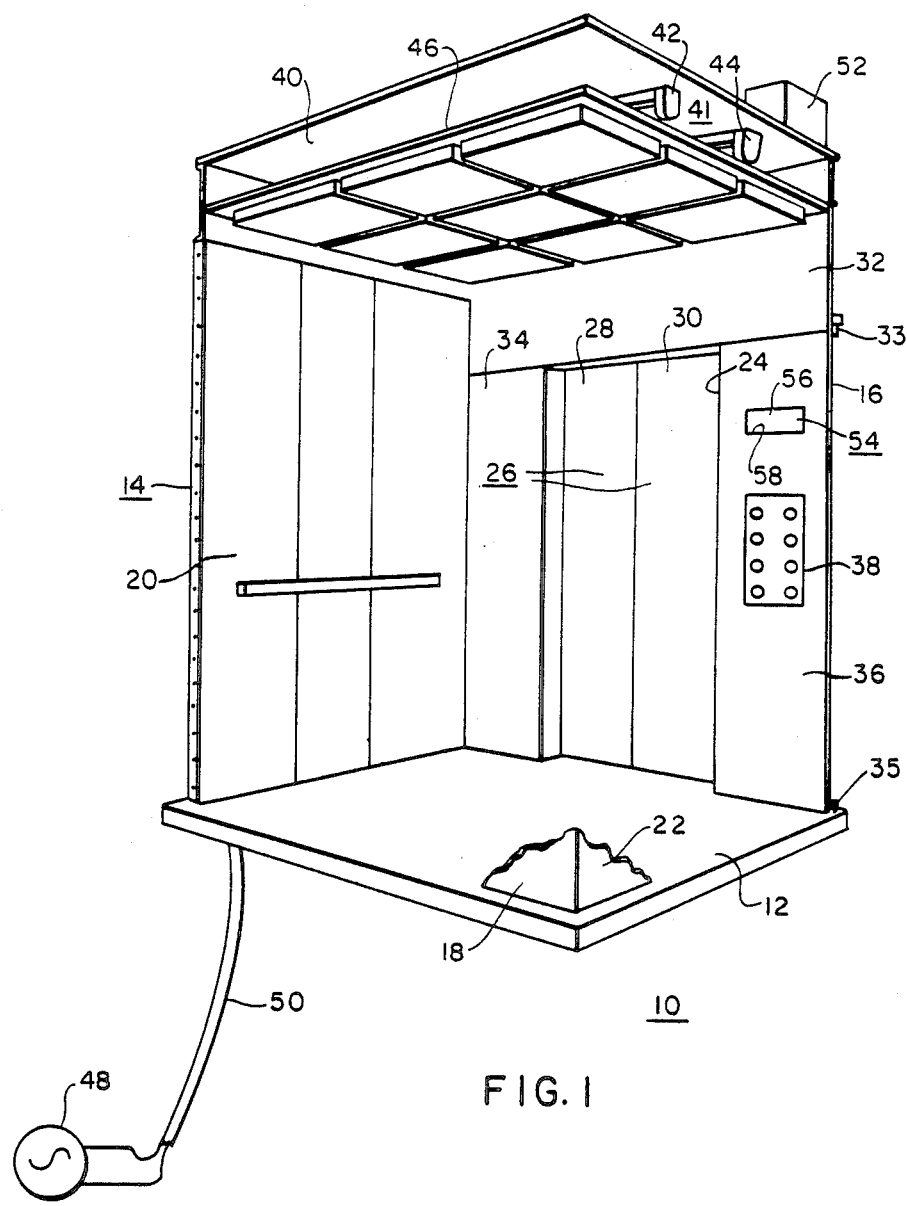
FIG. 1 is a perspective view of an elevator cab, shown partially cut away, illustrating the normal inconspicuous location of an emergency lighting source constructed according to the teachings of the invention.

Referring now to the drawings, and to FIG. 1 in particular, there is shown an elevator cab 10 constructed according to the teachings of the invention. Cab 10 includes a platform 12 upon which upstanding wall portions are assembled to define an enclosure 14, with the upstanding wall portions including front, rear, and first and second sidewall portions 16, 18, 20 and 22 respectively. The front wall portion 16 defines a passenger entrance opening 24, which may be a center opening, as illustrated, or a side opening, as desired. A door 26, having one or more panels, as required, such as door panels 28 and 30, is mounted to open and close the entrance opening 24. The front wall portion 16 may also include a transom 32 disposed above the door 26, and returns 34 and 36 disposed adjacent to the door panels 28 and 30, respectively. The returns 34 and 36 may be stationary or swing returns, as desired, with return 36 being illustrated as a swing return, having pivots 33 and 35. A car station is mounted in one or both of the returns, such as car station 38 in return 36.

A canopy 40 is attached to the upper edges of the enclosure 14. Cab lighting means 41, such as lighting fixtures 42 and 44, may be attached to the canopy 40, and a drop ceiling 46 may be suspended from the canopy 40 to conceal the source of the light, as well as to diffuse and uniformly distribute the light. Lighting fixtures 42 and 44 provide the normal cab lighting, and they are energized by a source 48 of electrical potential, which may be connected to the cab 10 via a traveling cable 50. Source 48 of electrical potential is the first or normal source, with a second or emergency power source 52 being provided, such as on the top of cab 10, which is automatically rendered effective by the failure of the normal source 48. For example, the normal source may energize a relay in the emergency source which connects the normal source to the charging input of the emergency source and disconnects the emergency source from its output terminals. The relay drops out upon failure of the normal source to connect the emergency source to its output terminals. The emergency power source 52 is connected to an emergency lighting source 54, with emergency lighting source 54 being shown in a first or normal position which it occupies when the normal power source 48 is functional. In the first or normal position, the emergency lighting source 54 is inconspicuous to passengers inside cab 10. As illustrated in FIG. 1, emergency lighting source 54 is preferably mounted in a return, below the transom 32, immediately above the car station, e.g., in flat major surface 37 of return 36 above car station 38. If two car stations are utilized, an emergency lighting source 54 may be provided above each car station. In the first or concealed position of lighting source 54, all that is apparent to passengers within cab 10 is a plate 56 disposed within an opening 58 in return 36, with plate 56 closely fitting the opening 58 with hairline joints. Plate 56, which is preferably constructed of the same material as the return 36, such as steel, includes first and second flat major opposed surfaces 57 and 59, with the surface 57 which faces the inside of cab 10 being in the same plane as the flat major surface 37 of return 36.

Cab 10 is assembled with a sling (not shown), which in turn is suspended in a hoistway, if it is part of a traction elevator system, or it may be supported on the end of a hydraulic jack, if it is part of a hydraulic elevator system.

Figure 2:
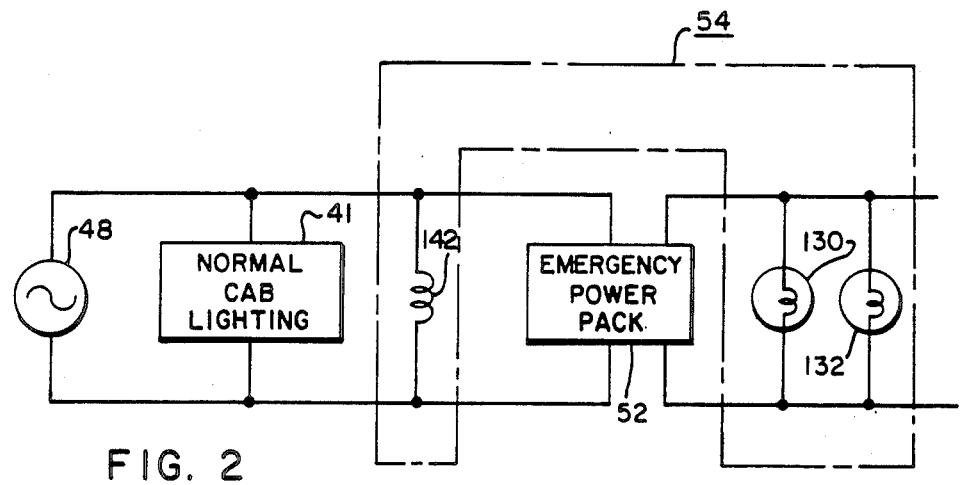
FIG. 2 is a schematic diagram which illustrates the electrical connection of the emergency lighting source to the normal and emergency power supplies.

FIG. 2 is a schematic diagram which illustrates the elecrical arrangement wherein the normal cab lighting means 41 is connected to the first or normal electrical power supply 48, and the emergency cab lighting means 54 is connected to both the normal and emergency power supplies 41 and 52. FIG. 2 will be hereinafter referred to when describing the emergency lighting source 54 in detail.

Figure 3:
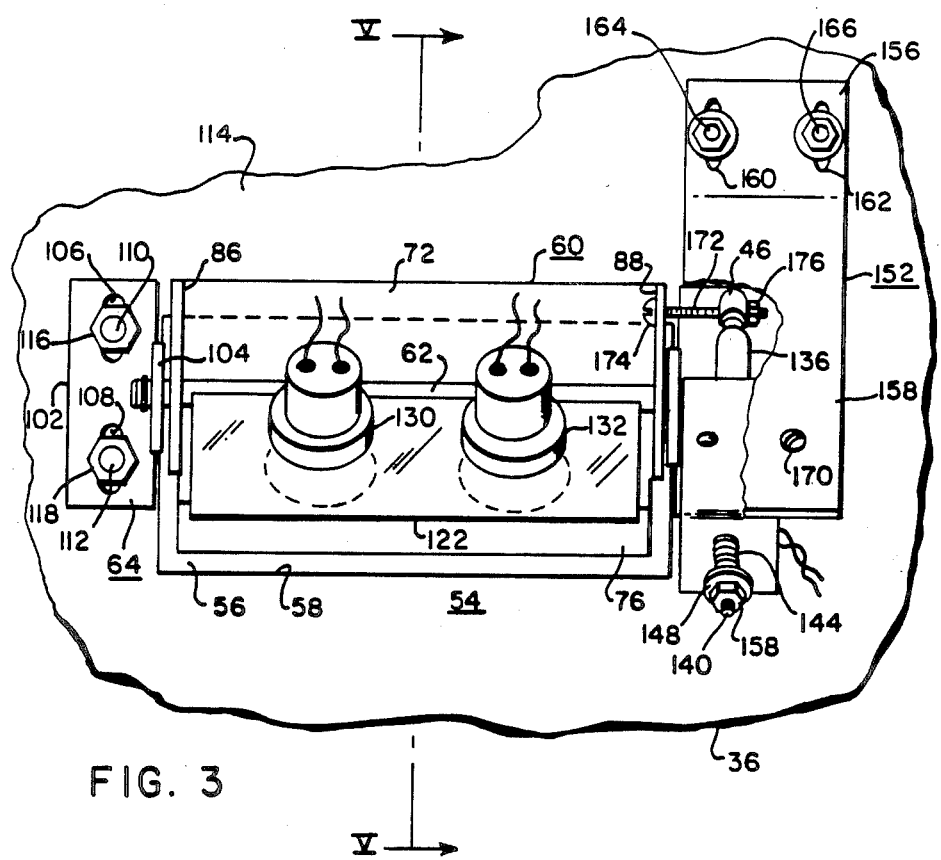
FIG. 3 is an elevational view of the rear of an emergency lighting source constructed according to the teachings of the invention, with the emergency lighting source being in its normal concealed position where it is concealed from passengers in the elevator cab.
Figure 4:
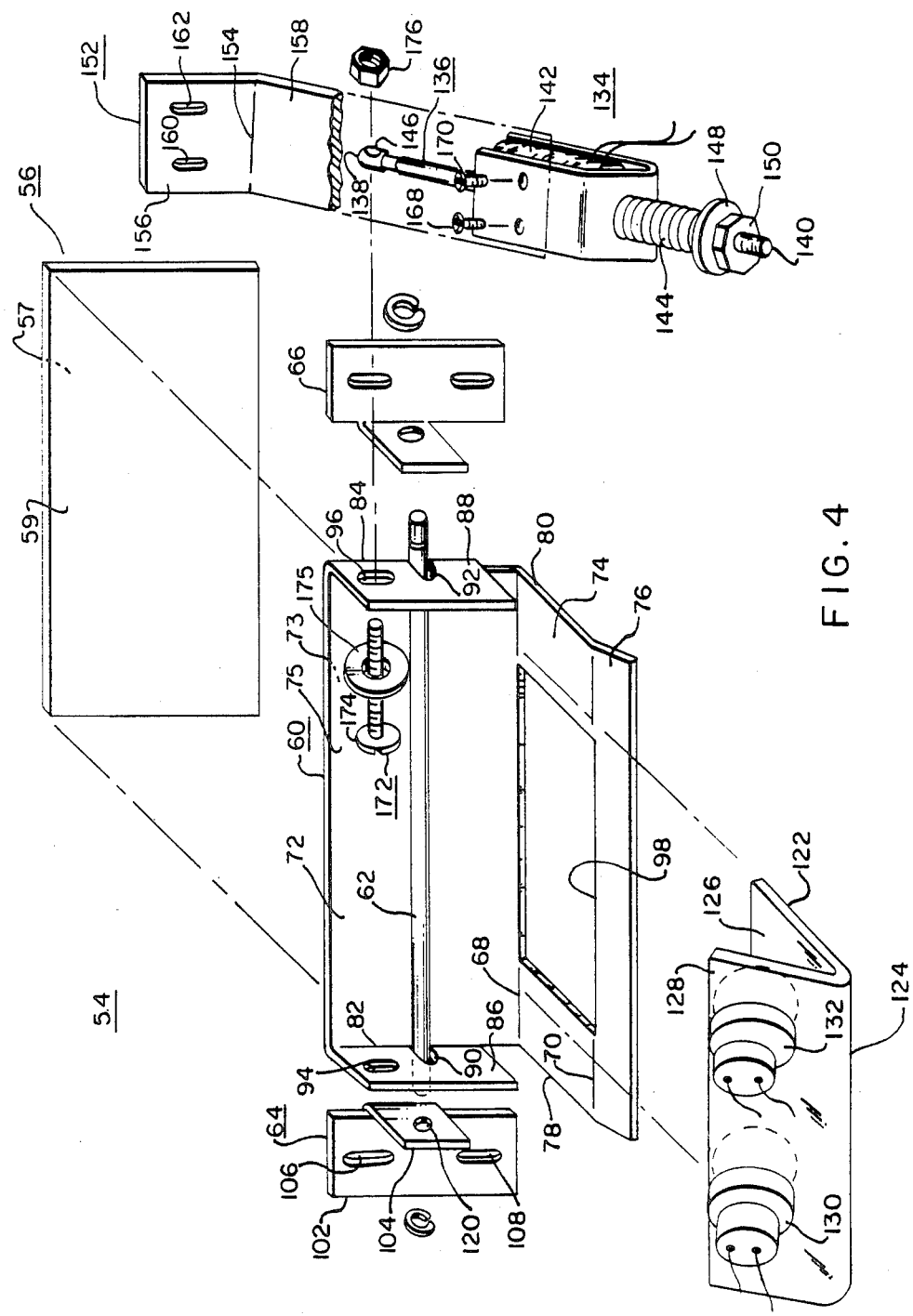
FIG. 4 is an exploded perspective view of the emergency lighting source shown in FIG. 3.

FIG. 3 is an elevational view of the rear or side of the emergency lighting source 54 which is behind the return 36, with the emergency lighting source 54 being shown in the position it occupies when the conventional power supply 48 is functional. FIG. 4 will also be referred to when describing emergency source 54, with FIG. 4 being an exploded perspective view of emergency source 54.

More specifically, emergency lighting source 54, in the preferred embodiment of the invention, is basically a fixture which includes a frame 60 which is pivotable about a pivot pin or rod 62, with the pivot pin 62 being supported by first and second spaced bracket members 64 and 66, respectively. Frame 60, which is best shown in FIG. 4, is formed from a metallic sheet member, with first and second spaced parallel bends 68 and 70 forming a right angle at the first bend 68 to form first and second leg portions 72 and 74, respectively. The second bend 70 is a 45 degree bend, forming a third leg 76. The first leg portion 72, which includes first and second flat major surfaces 73 and 75, respectively, is wider in a direction parallel with the bend lines 68 and 70 than the second and third legs 74 and 76, extending for an equal dimension past edges 78 and 80 of the second leg 74. Third and fourth spaced parallel right angle bends 82 and 84, which are aligned with edges 78 and 80, respectively, bend the material in a common direction away from surface 75 to form leg portions 86 and 88, respectively. Leg portions 86 and 88 have openings 90 and 92, repsectively, through which the pivot pin 62 extends. At least one of the leg portions 86 or 88 also includes an elongated opening, such as elongated openings 94 and 96 shown in leg portions 86 and 88, repsectively. Openings 94 and 96 provide operating points which may be used to link the frame 60 with an external driving force. An opening in each leg portion provides the option of driving frame 60 from either side.

A relatively large central portion of the second leg 74, which may also be called the base of frame 60, is cut away, to provide a rectangularly shaped opening 98.

Bracket members 64 and 66 are right angle brackets which may be of like construction. For example, bracket 64 has first and second leg portions 102 and 104, respectively. Leg portion 102 includes elongated openings 106 and 108 for receiving mounting studs 110 and 112 which are welded to the back surface 114 of the return 36. Nuts 116 and 118 secure bracket 64 to the return 36 once it is properly positioned in the vertical adjustment range provided by the elongated openings 106 and 108. Leg portion 104 includes an opening 120 for receiving pivot pin 62.

A lens 122 is formed from a rectangularly shaped piece of transparent plastic, such as a polycarbonate. A 45 degree bend 124 intermediate two opposite ends of the lens 122 provides first and second leg portions 126 and 128, respectively. Leg portion 126 is dimensioned to be slightly larger than opening 98 in the second leg portion or base 74 of frame 60. Leg portion 126 is centered over opening 98 and bonded to base 74 of frame 60 with a suitable adhesive. The second leg portion 128 of lens 122 supports first and second lamp fixtures and associated bulbs 130 and 132, respectively. Lamp fixtures 130 and 132 are electrically connected to emergency lighting source 54, as shown in FIG. 2.

Plate 56 has its major surface 59 bonded to surface 73 of the first leg portion 72 of frame 60, such as with a suitable adhesive. Plate 56 is positioned on leg portion 72 such that it will be horizontally oriented with opening 58 in the return 36 when the frame 60 is assembled with brackets 64 and 66 via the pivot pin 62. The elongated openings or slots 106 and 108 in the brackets 64 and 66 enable plate 56 to be correctly vertically positioned in opening 58.

An electrical solenoid 134 provides the force which controls the position of the emergency lighting means 54. Solenoid 134 includes an actuating rod 136 having first and second ends 138 and 140, respectively, an electrical coil 142 which is energized by the normal power source 48, as shown in FIG. 2, when the power source 48 is functional, and a compression spring 144. The first end 138 of rod 136 is provided with a clevis 146, and the second end 140 is threaded. Rod 136 is positioned within electrical coil 142 with the first and second ends of rod 136 extending outwardly from opposite axial ends of coil 142. Spring 144 is telescoped over the second end 140 of rod 136, and the spring is secured in this position by a washer 148 and nut 150. When electrical coil 142 is deenergized, spring 144 is in its uncompressed configuration, and when the coil 142 is energized it pulls rod 136 in a direction which compresses spring 144.

Solenoid 134 is supported from surface 114 of return 36 via a suitable bracket 152. Bracket 152, for example, may be formed from from a flat piece of sheet metal having an elongated, rectangular configuration. A bend 154 intermediate the ends of the bracket 152, which may be about 45 degrees, for example, forms a first leg 156 which is fixed to surface 114, and a second leg 158 to which the solenoid 134 is fixed. Leg 156 may have elongated openings 160 and 162 for receiving studs 164 and 166, respectively, which studs are welded to surface 114 of return 36. Leg 158 may have openings for receiving screws 168 and 170 which engage solenoid 134. The second leg 158 of bracket 152 extends downwardly and outwardly from surface 114 at a 45 degree angle, with the actuating rod 136 of solenoid 134 having a similar orientation. Bracket 152 is positioned on a selected side of frame 60 such that the clevis 146 has its openings closely spaced from, and oriented with, an elongated opening in one of the leg portions 86 or 88. As illustrated in the Figures, clevis 146 is close to leg portion 88, and a clevis pin 172 links opening 96 and clevis 146. Clevis pin 172 may be a screw having a head 174 and associated washer 175 which positions the pin relative to leg portion 88, with a nut 176 maintaining the pin relative to the clevis 146. The clevis pin 172 and opening 96 are dimensioned such that the pin 172 is free to slide in the elongated opening.

FIG. 5 is a cross sectional view of emergency lighting source 54 taken between and in the direction of arrows V—V in FIG. 5, with FIG. 5 illustrating source 54 in the normal concealed position it occupies when the normal source 48 of electrical potential is functional and solenoid 134 is energized. It will be noted that clevis pin 174 has been pushed to the upper end of elongated opening 96 by the actuating rod 136, which action occurs at the end of the stroke of the actuating rod 136 to firmly hold the associated plate 56 tightly within opening 58.

FIG. 6 is a view similar to that of FIG. 5, except illustrating emergency lighting source 54 in the exposed position which it occupies after the normal source 48 of electrical potential has failed, the solenoid 134 is deenergized, and the spring 144 has forced the solenoid to the dropped out configuration illustrated. Spring 144 forces the actuating rod 136 in a direction towards its second end 140, pivoting frame 60 about pivot pin 62 until the third leg 76 of frame 60 contacts surface 114 of return 36. Spring 144 maintains frame 60 in this position, until the solenoid 134 is energized, with this position of frame 60 pivoting plate 56 to allow lens 122 to project into the cab 10 to an extent which directs the light from lamp fixtures 130 and 132 downwardly over the car station 38 to the platform 12. It will be noted in FIG. 6 that the clevis pin 174 has positioned itself at a different positon in elongated opening 96 than it occupied during the energized position shown in FIG. 5, allowing the frame 60 and actuating rod 136 to be self accommodating as the rod 136 moves in a straight line and the frame 60 moves in a curved path during the actuation of the frame 60 between its two positions at the ends of the curved pivotal path. The emergency lighting fixture 54 remains in its exposed position, energized by the emergency power source 52, until the normal power supply 48 returns. Upon return of normal electrical power, the solenoid coil 142 will be automatically energized, pivoting frame 60 and its associated components back to the concealed position illustrated in FIG. 5.

We claim as our invention:

1. An elevator cab, comprising:
    a platform,
    upstanding front, rear, and side wall portions on said platform having inner surfaces defining an enclosure having a passenger entrance opening to the inside of said enclosure,
    a first electrical power supply for said cab,
    lighting means in said cab connected to said first electrical power supply,
    an emergency power supply carried by said cab which provides electrical power in response to failure of said first electrical power supply,
    and emergency lighting means in said cab,
    said emergency lighting means being movable between first and second positions which respectively conceal and expose the emergency lighting means, with respect to the inside of said enclosure,
    said emergency lighting means being electrically connected to both said first electrical power supply and to said emergency power supply,
    said first electrical power supply controlling the physical position of said emergency lighting means such that the emergency lighting means is normally in said concealed first position, moving to said exposed second position only when the first electrical power supply fails,
    said emergency power supply energizing said emergency lighting means to illuminate the inside of said enclosure via said emergency lighting means when the first electrical power supply fails.

2. The elevator cab of claim 1 wherein a selected wall portion has an opening therein for cooperation with the emergency lighting means, with the emergency lighting means including a plate member having a surface which, in the concealed first position of the emergency lighting means, smoothly continues the inner surface of the enclosure which is associated with the selected wall portion, with the remaining portion of the emergency lighting means being concealed behind said plate member, said plate member moving when the emergency lighting means changes from the concealed first position to the exposed second position, to enable the emergency lighting means to illuminate the inside of the enclosure.

3. The elevator cab of claim 2 wherein the selected wall portion is the front wall portion.

4. The elevator cab of claim 2 including a door operable to open and close the passenger entrance to the enclosure, and a transom above said door, and wherein the selected wall portion is the front wall portion, below said transom.

5. The elevator cab of claim 4 wherein the front wall portion below the transom is a swing return.

6. The elevator cab of claim 1 wherein the emergency lighting means includes pivot means which pivots the emergency lighting means between the concealed first position and the exposed second position, and including an electrical solenoid having an electrical coil connected to the first electrical power supply, said solenoid being arranged to hold the emergency lighting means in the concealed first position when said electrical coil is energized, and to automatically pivot the emergency lighting means to the exposed second position when said electrical coil is deenergized.

7. The elevator cab of claim 6 wherein said emergency lighting means includes a lens which extends into the enclosure when the emergency lighting means is in the exposed second position, with said lens pivoting to a concealed position when the emergency lighting means is in the first position.

* * * * *